US006834970B2

(12) United States Patent
Jackson et al.

(10) Patent No.: US 6,834,970 B2
(45) Date of Patent: Dec. 28, 2004

(54) CORNER CUBE SIDE DECREASE OF AMPLITUDE OF BEAM OF LIGHT

(75) Inventors: John Edwin Jackson, Carol Stream, IL (US); Christopher Brendan Svec, Palatine, IL (US)

(73) Assignee: Northrop Grumman Corporation, Woodland Hills, CA (US)

( * ) Notice: Subject to any disclaimer, the term of this patent is extended or adjusted under 35 U.S.C. 154(b) by 12 days.

(21) Appl. No.: 10/293,735

(22) Filed: Nov. 13, 2002

(65) Prior Publication Data

US 2004/0090676 A1 May 13, 2004

(51) Int. Cl.[7] .............................................. G02B 5/122
(52) U.S. Cl. ....................... 359/529; 359/834; 359/850; 359/900

(58) Field of Search ................................. 359/900, 850, 359/855–857, 885

(56) References Cited

U.S. PATENT DOCUMENTS 3,712,706 A  *  1/1973  Stamm ........................ 359/531
5,212,596 A  *  5/1993  Andrus ........................ 359/614

* cited by examiner

*Primary Examiner*—James Phan
(74) *Attorney, Agent, or Firm*—Patti & Brill, LLC

(57) ABSTRACT

An apparatus in one example comprises a corner cube that comprises a first side, a second side, and a third side that cooperate to retro-reflect an incoming beam of light and output an outgoing beam of light. One or more of the first side, the second side, and the third side of the corner cube serve to contribute substantially to a decrease of over twenty percent in an amplitude of the outgoing beam of light relative to an amplitude of the incoming beam of light.

21 Claims, 2 Drawing Sheets

CORNER CUBE SIDE DECREASE OF AMPLITUDE OF BEAM OF LIGHT

TECHNICAL FIELD

The invention relates generally to corner cubes and more particularly to an amplitude of a beam of light output by a corner cube.

BACKGROUND

Light emitters are employed in a variety of optical systems. A laser is one example of a light emitter. Exemplary uses of the laser comprise sensing, detection, measurement, and alignment in an optical system. For example, the optical system is in alignment when a laser beam that enters the system is reflected and exits the system in a path parallel to the path of the incoming laser beam. In a high power laser system, for example, the reflected beam of light is attenuated to avoid damaging a sensor device, such as a power detector. The laser system in one example comprises a corner cube retro-reflector and a filter. The corner cube retro-reflector in one example serves to reflect the incoming beam of light. The filter in one example serves to attenuate the reflected beam of light.

The corner cube retro-reflector in one example comprises three orthogonal high-reflectivity surfaces. The corner cube retro-reflector receives an input beam of light and outputs an output beam of light. The input beam of light comprises an amplitude and an intensity. The output beam of light comprises an amplitude and an intensity. The input beam of light sequentially reflects off the three surfaces of the corner cube retro-reflector. The output beam of light of the corner cube retro-reflector travels on a path parallel to that of the incoming beam of light of the corner cube retro-reflector. The output beam of light of the corner cube retro-reflector comprises the same amplitude and the same intensity as the amplitude and the intensity of the input beam of light to the corner cube retro-reflector.

The filter receives an input beam of light and outputs an output beam of light. The input beam of light comprises an amplitude and an intensity. The output beam of light comprises an amplitude and an intensity. The amplitude of the output beam of light is less than the amplitude of the input beam of light. The intensity of the output beam of light is less than the intensity of the input beam of light since the intensity of light is proportional to the square of the amplitude.

The corner cube retro-reflector is located anywhere in the optical system. For example, the corner cube retro-reflector is located at the end of the optical system. The filter is located anywhere in the optical system. For example, the filter is located at the opening of the corner cube retro-reflector. One shortcoming of the optical system results from the spatial distance between the filter and the reflective points of the sides of the corner cube retro-reflector. The distance between the filter and the reflective points of the sides of the corner cube retro-reflector contributes to the introduction of alignment errors between the input beam of light and the output beam of light of the optical system.

SUMMARY

One implementation of the invention encompasses an apparatus. The apparatus in one example comprises a corner cube that comprises a first side, a second side, and a third side that cooperate to retro-reflect an incoming beam of light and output an outgoing beam of light. One or more of the first side, the second side, and the third side of the corner cube serve to contribute substantially to a decrease of over twenty percent in an amplitude of the outgoing beam of light relative to an amplitude of the incoming beam of light.

Another implementation of the invention encompasses a method. An amplitude of an outgoing beam of light is decreased relative to an amplitude of an incoming beam of light by over twenty percent through substantial contribution by one or more of a first side, a second side, and a third side of a corner cube that cooperate to retro-reflect the incoming beam of light and output the outgoing beam of light.

DESCRIPTION OF THE DRAWINGS

Features of exemplary implementations of the invention will become apparent from the description, the claims, and the accompanying drawing in which:

DETAILED DESCRIPTION

Figure 1:
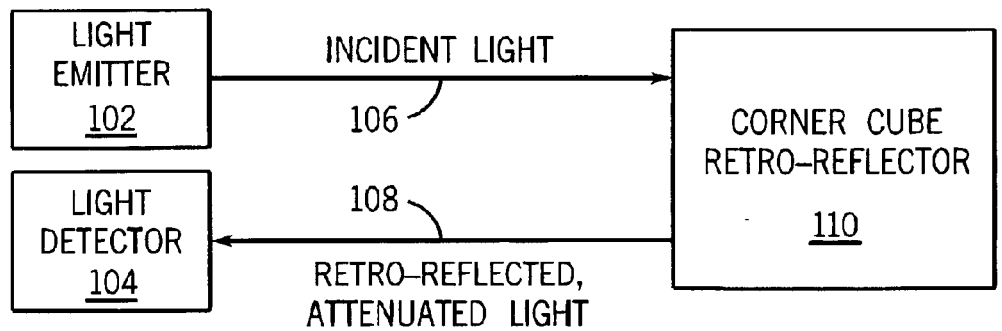
FIG. 1 is a representation of one exemplary implementation of an apparatus that comprises a light emitter, a light detector, one or more beams of light, and a corner cube retro-reflector.

Turning to FIG. 1, an apparatus 100 in one example comprises a corner cube that comprises a first side, a second side, and a third side that cooperate to retro-reflect an incoming beam of light and output an outgoing beam of light. One or more of the first side, the second side, and the third side of the corner cube serve to contribute substantially to a decrease of over twenty percent in an amplitude of the outgoing beam of light relative to an amplitude of the incoming beam of light. The apparatus 100 includes a plurality of components. A number of such components can be combined or divided in the apparatus 100.

The apparatus 100 in one example comprises a light emitter 102, a light detector 104, a beam of light 106, a beam of light 108, and a corner cube retro-reflector 110. The light emitter 102 in one example comprises a laser. The light detector 104 in one example comprises a sensor. The beam of light 106 comprises an output of the light emitter 102 and an input to the corner cube retro-reflector 110. The beam of light 108 comprises an output of the corner cube retro-reflector 110 and an input to the light detector 104. The corner cube retro-reflector 110 in one example serves to retro-reflect and attenuate the incoming beam of light 106.

The corner cube retro-reflector 110 in one example serves to cause a substantial decrease in an amplitude of the outgoing beam of light 108 relative to an amplitude of the incoming beam of light 106. In one example, the corner cube retro-reflector 110 serves to cause a twenty percent decrease in the amplitude of the outgoing beam of light 108 relative to the amplitude of the incoming beam of light 106. In another example, the corner cube retro-reflector 110 serves to cause a thirty percent decrease in the amplitude of the outgoing beam of light 108 relative to the amplitude of the incoming beam of light 106. In a further example, the corner cube retro-reflector 110 serves to cause a forty percent decrease in the amplitude of the outgoing beam of light 108 relative to the amplitude of the incoming beam of light 106. In yet another example, the corner cube retro-reflector 110 serves to cause a fifty percent decrease in the amplitude of the outgoing beam of light 108 relative to the amplitude of the incoming beam of light 106.

Figure 2:
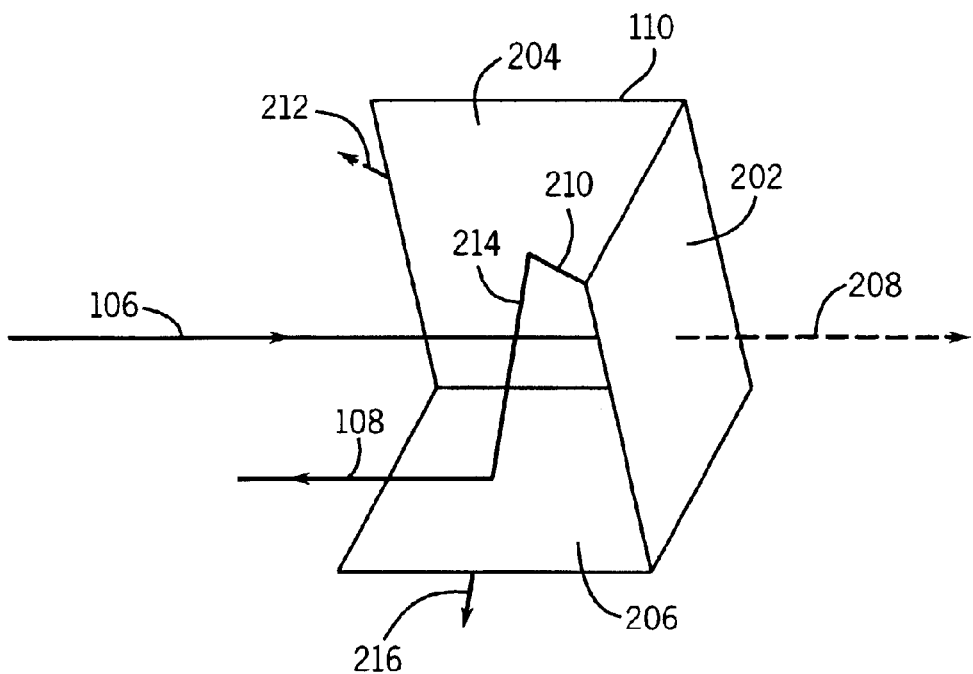
FIG. 2 is a partial, side representation of a number of the beams of light and the corner cube retro-reflector of the apparatus of FIG. 1.

Turning to FIG. 2, the corner cube retro-reflector 110 in one example comprises the sides 202, 204, and 206. One or more of the sides 202, 204, and 206 cause one or more respective significant subportions of a decrease in the amplitude of the outgoing beam of light 108 relative to the amplitude of the incoming beam of light 106. For example, the side 202 serves to cause a substantial decrease in the amplitude of the outgoing beam of light 108 relative to the amplitude of the incoming beam of light 106. The side 202 alone in one example serves to cause a significant decrease in the amplitude of the outgoing beam of light 108 relative to the amplitude of the incoming beam of light 106. The sides 202 and 204 together in one example serve to cause a substantial decrease in the amplitude of the outgoing beam of light 108 relative to the amplitude of the incoming beam of light 106. The sides 202 and 206 together in one example serve to cause a substantial decrease in the amplitude of the outgoing beam of light 108 relative to the amplitude of the incoming beam of light 106. The side 204 alone in one example serves to cause a substantial decrease in the amplitude of the outgoing beam of light 108 relative to the amplitude of the incoming beam of light 106. The sides 204 and 206 together in one example serve to cause a substantial decrease in the amplitude of the outgoing beam of light 108 relative to the amplitude of the incoming beam of light 106. The sides 202, 204, and 206 together in one example serve to cause a substantial decrease in the amplitude of the outgoing beam of light 108 relative to the amplitude of the incoming beam of light 106.

The side 202 in one example receives an incoming beam of light 106 and outputs a partially transmitted beam of light 208 and an outgoing beam of light 210. The partially transmitted beam of light 208 comprises the subportion of the incoming beam of light 106 refracted by the side 202. The outgoing beam of light 210 in one example comprises the subportion of the incoming beam of light 106 reflected off the side 202.

The side 204 in one example receives an incoming beam of light 210 and outputs a partially transmitted beam of light 212 and an outgoing beam of light 214. The partially transmitted beam of light 212 comprises the subportion of the incoming beam of light 210 refracted by the side 204. The outgoing beam of light 214 in one example comprises the subportion of the incoming beam of light 210 reflected off the side 204.

The side 206 in one example receives an incoming beam of light 214 and outputs a partially transmitted beam of light 216 and an outgoing beam of light 108. The partially transmitted beam of light 216 in one example comprises the subportion of the incoming beam of light 214 refracted by the side 206. The outgoing beam of light 108 in one example comprises the subportion of the incoming beam of light 214 reflected off the side 206.

The amplitude of the outgoing beam of light 210 in one example comprises a decrease of twenty percent relative to the amplitude of the incoming beam of light 106. The amplitude of the outgoing beam of light 214 in one example comprises a decrease of thirty percent relative to the amplitude of the incoming beam of light 210. The amplitude of the outgoing beam of light 108 in one example comprises a decrease of forty percent relative to the amplitude of the incoming beam of light 214.

The amplitude of the partially transmitted beam of light 208 in one example comprises a decrease of twenty percent relative to the amplitude of the incoming beam of light 106. The partially transmitted beam of light 212 in one example comprises a decrease of thirty percent relative to the amplitude of the incoming beam of light 210. The amplitude of the partially transmitted beam of light 216 in one example comprises a decrease of forty percent relative to the amplitude of the incoming beam of light 214.

Figure 3:
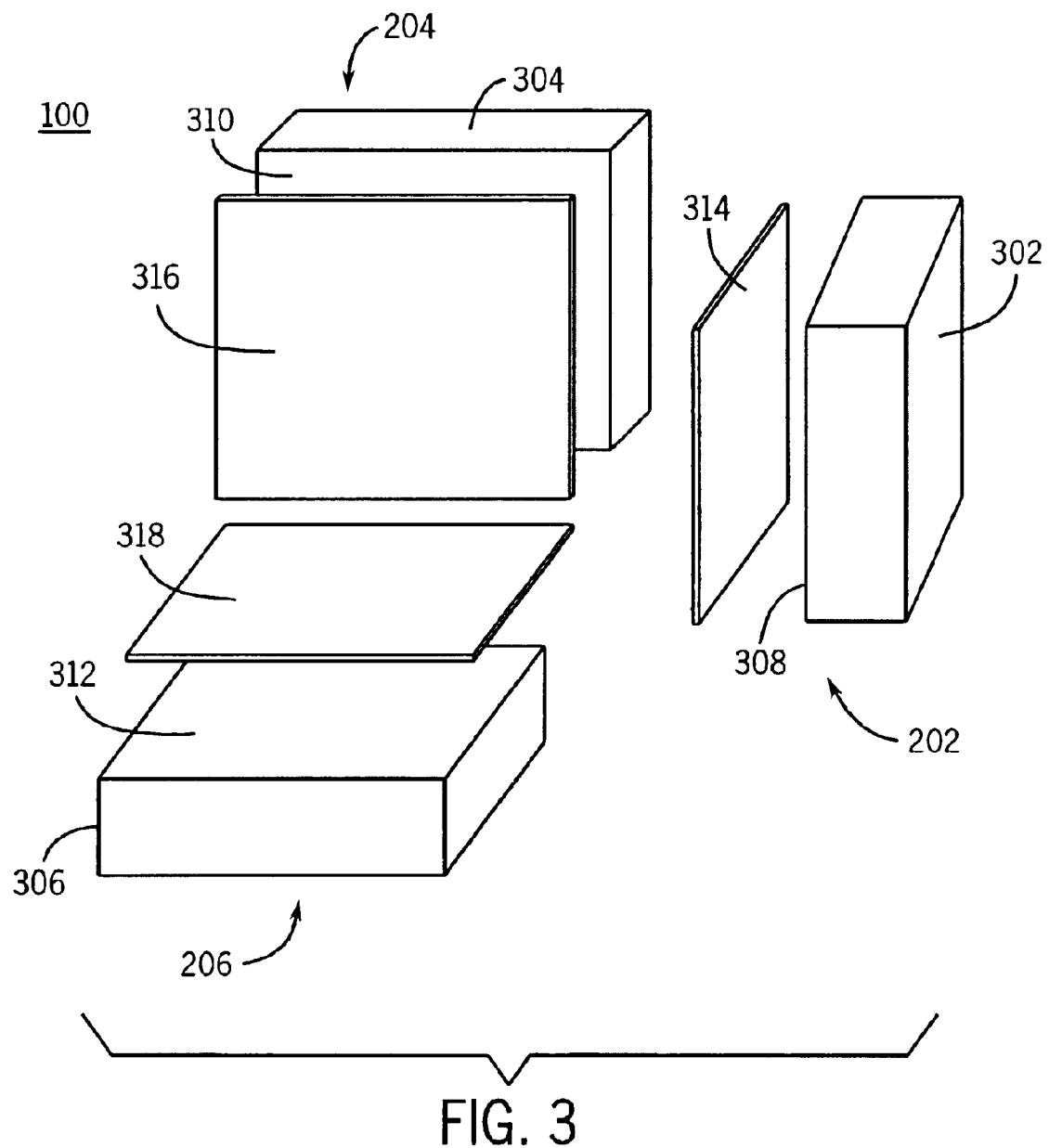
FIG. 3 is an exploded, partial representation of the corner cube retro-reflector of the apparatus of FIG. 1.

Turning to FIG. 3, the sides 202, 204, and 206 in one example comprise respective substrates 302, 304, and 306. One or more of the substrates 302, 304, and 306 in one example comprise a thickness between 1.0 millimeters (mm) and 2.0 millimeters (mm). Exemplary thicknesses of the substrates 302, 304, and 306 comprise 1.0 millimeter (mm), 1.5 millimeters (mm), and 2.0 millimeters (mm). In one example, the thicknesses of two or more of the substrates 302, 304, and 306 are substantially the same. In further example, the thicknesses of two or more of the substrates 302, 304, and 306 are different.

Exemplary materials for one or more of the substrates 302, 304, and 306 comprise Pyrex, zinc sulfide, glass, silicon, and polished gold. In one example, two or more of the substrates 302, 304, and 306 comprise substantially same materials. In a further example, two or more of the substrates 302, 304, and 306 comprise different materials.

One or more of the substrates 302, 304, and 306 in one example cause or contribute to causing one or more respective significant subportions of a decrease in the amplitude of the outgoing beam of light 108 relative to the amplitude of the incoming beam of light 106. The substrate 302 in one example serves to provide a substantial decrease in the amplitude of a beam of light incident to the side 202. The substrate 302 in one example serves to provide a subportion of the decrease in the amplitude of a beam of light incident to the side 202. The substrate 304 in one example serves to provide a substantial decrease in the amplitude of a beam of light incident to the side 204. In another example, the substrate 304 serves to provide a subportion of the decrease in the amplitude of a beam of light incident to the side 204. The substrate 306 in one example serves to provide a substantial decrease in the amplitude of a beam of light incident to the side 206. In another example, the substrate 306 serves to provide a subportion of the decrease in the amplitude of a beam of light incident to the side 206.

Returning to FIG. 3, zero or more of the sides 202, 204, and 206 comprises a coating. In one example, the side 202 comprises a coating 314. In another example, the side 202 omits the coating 314. In one example, the side 204 comprises a coating 316. In another example, the side 204 omits the coating 316. In one example, the side 206 comprises a coating 318. In another example, the side 206 omits the coating 318.

For example, one or more of the coatings 314, 316, and 318 comprises a thickness between 0.2 micrometers ($\mu$m) and 0.9 micrometers ($\mu$m). Exemplary thicknesses of the coatings 314, 316, and 318 comprise 0.28 micrometers ($\mu$m), 0.55 micrometers ($\mu$m), and 0.80 micrometers ($\mu$m). In one example, the thicknesses of two or more of the coatings 314, 316, and 318 are substantially the same. In a further example, the thicknesses of two or more of the coatings 314, 316, and 318 are different.

Exemplary materials for one or more of the coatings 314, 316, and 318 comprise magnesium fluoride, mirror material, anti-reflective ("AR") material, high reflectivity ("HR") material, Fresnel reflective material, and spectral filtration reflective materials. In one example, the materials of two or more of the coatings 314, 316, and 318 are substantially the same. In a further example, the materials of two or more of the coatings 314, 316, and 318 are different.

Anti-reflective materials in one example comprise materials that reflect less than an eighty percent of the intensity of the incident beam of light of light. High reflectivity materials in one example comprise materials that reflect at least eighty percent of the intensity of the incident beam of light of light. Metallic coatings in one example comprise between about eighty percent and about ninety six percent reflectivity of the incident beam of light. The coating 314 in one example comprises a dielectric coating over the metallic coating. The combination of the dielectric coating over the metallic coating in one example achieves about 99.5 percent reflectivity of the incoming beam of light 106. Fresnel reflective or spectral filtration reflective materials in one example comprise materials that filter out portions of a beam of light based on wavelength.

One or more of the coatings 314, 316, and 318 in one example cause or contribute to causing one or more respective significant subportions of a decrease in the amplitude of the outgoing beam of light 108 relative to the amplitude of the incoming beam of light 106. The coating 314 in one example serves to provide a significant subportion of the decrease in the amplitude of a beam of light incident to the side 202. The coating 314 in one example serves to provide a substantial portion of the decrease in the amplitude of a beam of light incident to the side 202. The coating 316 serves to provide a significant subportion of the decrease in the amplitude of a beam of light incident to the side 204. The coating 316 in one example serves to provide a substantial portion of the decrease in the amplitude of a beam of light incident to the side 204. The coating 318 in one example serves to provide a significant subportion of the decrease in the amplitude of a beam of light incident to the side 206. The coating 318 in one example serves to provide a substantial portion of the decrease in the amplitude of a beam of light incident to the side 206.

The incoming beam of light 106 in one example is incident to the side 202. The beam of light 210 in one example comprises a subportion of the incoming beam of light 106 reflected off the side 202. The incoming beam of light 210 in one example is incident to the side 204. The outgoing beam of light 214 in one example comprises the subportion of the incoming beam of light 210 reflected off the side 204. The incoming beam of light 214 in one example is incident to the side 206. The outgoing beam of light 108 in one example comprises the incoming beam of light 214 reflected off the side 206.

One or more of the substrates 302, 304, and 306 and respective one or more of the coatings 314, 316, and 318 in one example cause or contribute to causing one or more respective significant subportions of a decrease in the amplitude of the outgoing beam of light 108 relative to the amplitude of the incoming beam of light 106. The side 202 in one example comprises a substrate 302 and a coating 314. The substrate 302 in one example serves to provide a decrease in the amplitude of the beam of light reflected by the substrate 302 relative to the amplitude of the beam of light incident to the substrate 302. The coating 314 in one example serves to provide a decrease in the amplitude of the outgoing beam of light 210 relative to the amplitude of the incoming beam of light 106. The incoming beam of light 106 in one example strikes the side 202. The coating 314 in one example reflects the incoming beam of light 106. The coating 314 in one example refracts the incoming beam of light 106. The amplitude of the outgoing beam of light 210 in one example comprises a decrease relative to the amplitude of the incident beam of light 106. The beam of light refracted by the coating 314 in one example comprises a significant subportion of the incoming beam of light 106. The beam of light refracted by the coating 314 in one example is incident upon the substrate 302.

The substrate 302 in one example reflects the beam of light incident to the substrate 302 back into the coating 314. The beam of light reflected by the substrate 302 in one example comprises a significant subportion of the amplitude of the beam of light incident to the substrate 302. The substrate 302 in one example refracts the beam of light incident to the substrate 302. The beam of light 208 in one example comprises the refracted beam of light that is partially transmitted through the substrate 302. The beam of light 208 in one example comprises a subportion of the amplitude of the beam of light incident to the substrate 302.

An illustrative description of exemplary operation of the apparatus 100 is now presented, for explanatory purposes.

The light emitter 102 emits a beam of light 106. The beam of light 106 comprises an intensity and an amplitude. The beam of light 106 is input to the corner cube retro-reflector 110. The side 202 receives the incoming beam of light 106. The side 202 comprises the coating 314 and the substrate 302. The coating 314 in one example comprises an anti-reflective material. The substrate 302 comprises glass. The coating 314 reflects the beam of light 106 to the side 204. The beam of light reflected by the coating 314 comprises the beam 210. The coating 314 reflects about thirty percent of the intensity of the beam incident to the coating 314. The substrate 302 receives the remaining seventy percent of the beam of light 106. The seventy percent amplitude refracted by the coating is incident on the substrate 302. The substrate 302 refracts the incident beam of light. The substrate 302 serves to reflect the incident beam of light back through the coating 314. The substrate 302 serves to provide a five percent decrease in the amplitude of the reflected beam of light relative to the beam of light incident to the substrate 302. The amplitude of the outgoing beam of light 210 is dependent on interference between the beam of light reflected by the coating 314 and the beam of light reflected by the substrate 302. The beam of light 208 comprises the beam of light refracted in the substrate 302 and partially transmitted out of the substrate 302.

The side 204 receives the outgoing beam of light 210. The side 204 comprises a coating 316 and a substrate 304. The coating 316 comprises an anti-reflective material. The substrate 304 comprises silicon. The coating 316 reflects the incoming beam of light 210. The coating 316 reflects approximately forty percent of the intensity of the beam incident to the coating 316. The coating 316 further serves to refract the incoming beam of light 210. The beam of light refracted by the coating 316 strikes the substrate 304. The substrate 304 serves to reflect the beam of light refracted by the coating 316. The substrate 304 serves to provide a ten percent decrease in the amplitude of the beam of light incident to the substrate 304 relative to the beam of light reflected by the substrate 304. The amplitude of the outgoing beam of light 212 is dependent on the interference between the beam of light reflected by the coating 316 and the beam of light reflected by the substrate 304. The substrate 304 further serves to refract the beam of light incident to the substrate 304. The beam of light 212 comprises the beam of light refracted in the substrate 304 and partially transmitted out of the substrate 304.

The side 206 receives the incoming beam of light 214. The side 206 omits the coating 318 and comprises the substrate 306. The substrate 306 comprises a high-reflectivity material, for example, polished gold. The substrate 306 reflects the beam of light 214. The substrate 306 outputs the outgoing beam of light 108. The substrate 306 reflects approximately ninety-eight percent of the intensity of the beam incident to the substrate 306. The beam of light 108 in one example therefore comprises about ninety eight percent of the intensity of the beam of light 214. The beam of light 108 comprises approximately three percent of the intensity of the beam of light 106. The approximately remaining two percent of the beam of light 214 incident to the side 206 refracts in substrate 306. The beam of light 216 comprises the beam of light refracted in the substrate 306 and partially transmitted out of the substrate 306. The beam of light 108 inputs to the light detector 104.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a corner cube that comprises a first side, a second side, and a third side that cooperate to retro-reflect an incoming beam of light and output an outgoing beam of light;
wherein one or more of the first side, the second side, and the third side of the corner cube serve to contribute substantially to a decrease of over twenty percent in an amplitude of the outgoing beam of light relative to an amplitude of the incoming beam of light;
wherein the first side contributes a first subportion of the decrease of the amplitude of the outgoing beam of light relative to the amplitude of the incoming beam of light, wherein the first subportion differs from a second subportion contributed by one of the second side and the third side.

2. The apparatus of claim 1, wherein the first subportion comprises a significant subportion of the decrease of the amplitude of the outgoing beam of light relative to the amplitude of the incoming beam of light;
wherein the first side serves to cause at least the significant subportion of the decrease of the amplitude of the outgoing beam of light relative to the amplitude of the incoming beam of light.

3. The apparatus of claim 2, wherein the second side contributes the second subportion, wherein the first subportion and the second subportion comprise substantially all the decrease of the amplitude of the outgoing beam of light relative to the amplitude of the incoming beam of light.

4. The apparatus of claim 2, wherein the second side contributes the second subportion wherein the third side contributes a third subportion of the decrease of the amplitude of the outgoing beam of light relative to the amplitude of the incoming beam of light, wherein the first subportion, the second subportion, and the third subportion comprise substantially all the decrease of the amplitude of the outgoing beam of light relative to the amplitude of the incoming beam of light.

5. The apparatus of claim 2, wherein the first side comprises a coating that serves to cause the at least the significant subportion of the decrease of the amplitude of the outgoing beam of light relative to the amplitude of the incoming beam of light.

6. The apparatus of claim 5, wherein the at least the significant subportion of the decrease of the amplitude of the outgoing beam of light relative to the amplitude of the incoming beam of light comprises a first significant subportion of the decrease of the amplitude of the outgoing beam of light relative to the amplitude of the incoming beam of light, wherein the coating comprises a first coating, wherein the second side comprises a second coating that serves to cause a second significant subportion of the decrease of the amplitude of the outgoing beam of light relative to the amplitude of the incoming beam of light.

7. The apparatus of claim 6, wherein the third side comprises a third coating that serves to cause a third significant subportion of the decrease of the amplitude of the outgoing beam of light relative to the amplitude of the incoming beam of light.

8. The apparatus of claim 2, wherein the first side comprises a substrate that serves to cause the at least the significant subportion of the decrease of the amplitude of the outgoing beam of light relative to the amplitude of the incoming beam of light.

9. The apparatus of claim 8, wherein the substrate comprises a thickness between 1.0 millimeters and 2.0 millimeters.

10. The apparatus of claim 8, wherein the second side contributes the second subportion of the decrease of the amplitude of the outgoing beam of light relative to the amplitude of the incoming beam of light, wherein the at least the significant subportion of the decrease of the amplitude of the outgoing beam of light relative to the amplitude of the incoming beam of light comprises a first significant subportion of the decrease of the amplitude of the outgoing beam of light relative to the amplitude of the incoming beam of light, wherein the substrate comprises a first substrate, wherein the second side comprises a second substrate that serves to cause a second significant subportion of the decrease of the amplitude of the outgoing beam of light relative to the amplitude of the incoming beam of light.

11. The apparatus of claim 10, wherein the third side comprises a third substrate that serves to cause a third significant subportion of the decrease of the amplitude of the outgoing beam of light relative to the amplitude of the incoming beam of light.

12. The apparatus of claim 1, wherein one or more of the first side, the second side, and the third side of the corner cube serve to contribute substantially to a decrease of at least thirty percent in the amplitude of the outgoing beam of light relative to the amplitude of the incoming beam of light.

13. The apparatus of claim 1, wherein one or more of the first side, the second side, and the third side of the corner cube serve to contribute substantially to a decrease of at least forty percent in the amplitude of the outgoing beam of light relative to the amplitude of the incoming beam of light.

14. An apparatus, comprising:
a corner cube that comprises a first side, a second side, and a third side that cooperate to retro-reflect an incoming beam of light and output an outgoing beam of light;
wherein one or more of the first side, the second side, and the third side of the corner cube serve to contribute substantially to a decrease of over twenty percent in an amplitude of the outgoing beam of light relative to an amplitude of the incoming beam of light;

wherein the first side serves to cause at least a significant subportion of the decrease of the amplitude of the outgoing beam of light relative to the amplitude of the incoming beam of light;

wherein the first side serves to cause substantially all the decrease of the amplitude of the outgoing beam of light relative to the amplitude of the incoming beam of light.

15. An apparatus, comprising:

a corner cube that comprises a first side, a second side, and a third side that cooperate to retro-reflect an incoming beam of light and output an outgoing beam of light;

wherein one or more of the first side, the second side, and the third side of the corner cube serve to contribute substantially to a decrease of over twenty percent in an amplitude of the outgoing beam of light relative to an amplitude of the incoming beam of light;

wherein the first side serves to cause at least a significant subportion of the decrease of the amplitude of the outgoing beam of light relative to the amplitude of the incoming beam of light;

wherein the first side comprises a coating that serves to cause the at least the significant subportion of the decrease of the amplitude of the outgoing beam of light relative to the amplitude of the incoming beam of light;

wherein the coating comprises a thickness between 0.2 micrometers and 0.9 micrometers.

16. The apparatus of claim 15, wherein the first side comprises a substrate that serves to support the coating, wherein the substrate comprises a thickness between 1.0 millimeters and 2.0 millimeters.

17. An apparatus, comprising:

a corner cube that comprises a first side, a second side and a third side that cooperate to retro-reflect an incoming beam of light and output an outgoing beam of light;

wherein one or more of the first side, the second side, and the third side of the corner cube serve to contribute substantially to a decrease of over twenty percent in an amplitude of the outgoing beam of light relative to an amplitude of the incoming beam of light;

wherein the first side serves to cause at least a significant subportion of the decrease of over twenty percent in the amplitude of the outgoing beam of light relative to the amplitude of the incoming beam of light;

wherein the first side comprises a coating that serves to cause the at least the significant subportion of the decrease of the amplitude of the outgoing beam of light relative to the amplitude of the incoming beam of light;

wherein the at least the significant subportion of the decrease of the amplitude of the outgoing beam of light relative to the amplitude of the incoming beam of light comprises a first significant subportion of the decrease of the amplitude of the outgoing beam of light relative to the amplitude of the incoming beam of light, wherein the coating comprises a first coating, wherein the second side comprises a second coating that serves to cause a second significant subportion of the decrease of the amplitude of the outgoing beam of light relative to the amplitude of the incoming beam of light, wherein the third side comprises a substrate that serves to cause a third significant subportion of the decrease of the amplitude of the outgoing beam of light relative to the amplitude of the incoming beam of light.

18. An apparatus, comprising:

a corner cube that comprises a first side, a second side, and a third side that cooperate to retro-reflect an incoming beam of light and output an outgoing beam of light;

wherein one or more of the first side, the second side, and the third side of the corner cube serve to contribute substantially to a decrease of over twenty percent in an amplitude of the outgoing beam of light relative to an amplitude of the incoming beam of light;

wherein the first side serves to cause at least a significant subportion of the decrease of over twenty percent in the amplitude of the outgoing beam of light relative to the amplitude of the incoming beam of light;

wherein the first side comprises a coating that serves to cause the at least the significant subportion of the decrease of the amplitude of the outgoing beam of light relative to the amplitude of the incoming beam of light;

wherein the at least the significant subportion of the decrease of the amplitude of the outgoing beam of light relative to the amplitude of the incoming beam of light comprises a first subportion of the decrease of the amplitude of the outgoing beam of light relative to the amplitude of the incoming beam of light, wherein the second side comprises a substrate that serves to cause a second significant subportion of the decrease of the amplitude of the outgoing beam of light relative to the amplitude of the incoming beam of light.

19. The apparatus of claim 18, wherein the substrate comprises a first substrate, wherein the third side comprises a second substrate that serves to cause a third significant subportion of the decrease of the amplitude of the outgoing beam of light relative to the amplitude of the incoming beam of light.

20. A method, comprising the steps of:

decreasing an amplitude of an outgoing beam of light relative to an amplitude of an incoming beam of light by over twenty percent through substantial contribution by one or more of a first side, a second side, and a third side of a corner cube that cooperate to retro-reflect the incoming beam of light and output the outgoing beam of light;

decreasing by the first side, a first subportion of the decrease of the amplitude of the outgoing beam of light relative to the amplitude of the incoming beam of light; and decreasing by one of the second side mid the third side, a second subportion of the amplitude of the outgoing beam of light relative to the amplitude of the incoming beam of light, wherein the First subportion differs from the second subportion.

21. The method of claim 20, further comprising the steps of:

decreasing by a first substrate of the first side, by the first subportion of the decrease of the amplitude of the outgoing beam of light relative to the amplitude of the incoming beam of light; and decreasing by one or more substrates and one or more coatings of the one of the second side and the third side, the second subportion of the decrease of the amplitude of the outgoing beam of light relative to the amplitude of the incoming beam of light.

* * * * *